US010657126B2

(12) United States Patent
Patel et al.

(10) Patent No.: US 10,657,126 B2
(45) Date of Patent: May 19, 2020

(54) META-JOIN AND META-GROUP-BY INDEXES FOR BIG DATA

(71) Applicant: Cadreon LLC, San Francisco, CA (US)

(72) Inventors: Bhupendra Mohanlal Patel, Fremont, CA (US); Tushar Patel, San Francisco, CA (US)

(73) Assignee: Cadreon LLC, San Francisco, CA (US)

( * ) Notice: Subject to any disclaimer, the term of this patent is extended or adjusted under 35 U.S.C. 154(b) by 121 days.

(21) Appl. No.: 15/409,990

(22) Filed: Jan. 19, 2017

(65) Prior Publication Data

US 2018/0181616 A1 Jun. 28, 2018

Related U.S. Application Data

(60) Provisional application No. 62/438,997, filed on Dec. 23, 2016.

(51) Int. Cl.
*G06F 16/00* (2019.01)
*G06F 16/2453* (2019.01)
*G06F 16/22* (2019.01)
*G06F 16/2455* (2019.01)

(52) U.S. Cl.
CPC ...... *G06F 16/24537* (2019.01); *G06F 16/221* (2019.01); *G06F 16/2237* (2019.01); *G06F 16/2456* (2019.01)

(58) Field of Classification Search
CPC ......... G06F 17/30466; G06F 17/30442; G06F 17/30498
See application file for complete search history.

(56) References Cited

U.S. PATENT DOCUMENTS

| 5,408,654 | A | | 4/1995 | Barry | |
|---|---|---|---|---|---|
| 5,848,408 | A | * | 12/1998 | Jakobsson | ......... G06F 17/30445 707/714 |
| 5,899,988 | A | * | 5/1999 | Depledge | .......... G06F 17/30312 |
| 5,903,888 | A | * | 5/1999 | Cohen | ............... G06F 16/24557 |
| 6,094,647 | A | | 7/2000 | Kato | |
| 6,356,897 | B1 | | 3/2002 | Gusack | |
| 7,158,996 | B2 | * | 1/2007 | Croisettier | .......... G06F 16/2272 707/741 |

(Continued)

OTHER PUBLICATIONS

PCT International Search Report and Written Opinion for PCT/US17/68382, dated Apr. 6, 2018, 12 pages.

*Primary Examiner* — Hung Q Pham
(74) *Attorney, Agent, or Firm* — Loeb & Loeb LLP

(57) ABSTRACT

Embodiments of the invention improve over conventional or routine technologies by generating a separate data structure or organization, other than those temporary search files that are typically used, that facilitates the processing of the datasets. In one embodiment, instead of using sorted temp files or running sorting algorithms, a meta-join and/or meta-group-by indexes may be generated or created that provide a quick access to the records in the datasets. Moreover, embodiments of the invention eliminate the need to sort or pre-sort datasets before or during a query is conducted on the dataset. Aspects of the invention use, for example, the meta-join and/or meta-group-by indexes to pre-organize the data such that, when executing a query against the dataset, the query is executed against the meta-join and/or meta-group-by indexes.

20 Claims, 18 Drawing Sheets

(56) References Cited

U.S. PATENT DOCUMENTS

| | | | |
|---|---|---|---|
| 8,516,008 B1 * | 8/2013 | Marquardt | G06F 16/2455 707/802 |
| 2002/0103737 A1 | 8/2002 | Briere | |
| 2010/0114952 A1 | 5/2010 | Scanlon | |
| 2011/0055192 A1 | 3/2011 | Tang | |

* cited by examiner

FIG. 1

| # | LUID | PID | AGE _106_ | GENDER _104_ | INCOME |
|---|---|---|---|---|---|
| 1 | L1 | P1 | 50 | F | 60K |
| 2 | L1 | P2 | 35 | F | 65K |
| 3 | L2 | P3 | 70 | M | 120K |
| 4 | L2 | P4 | 70 | F | 100K |
| 5 | L3 | P5 | 50 | F | 200K |
| 6 | L3 | P6 | 35 | M | 160K |
| 7 | L4 | P7 | 50 | F | 80K |
| 8 | L5 | P8 | 35 | M | 220K |
| 9 | L5 | P9 | 35 | F | 100K |
| 10 | L5 | P10 | 6 | M | 0 |

FIG. 2

| # | LUID | Network | Series | ViewedFor | ShowDate |
|---|------|---------|--------|-----------|----------|
| 1 | L1 | Discovery | Life | 45 | 01/03/2016 |
| 2 | L2 | ABC | Twisted | 60 | 01/03/2016 |
| 3 | L3 | CNN | Early Start | 30 | 01/03/2016 |
| 4 | L4 | Discovery | Life | 45 | 01/03/2016 |
| 5 | L5 | Disney | Mickey Mouse | 20 | 01/03/2016 |
| 6 | L1 | ABC | Twisted | 45 | 01/03/2016 |
| 7 | L2 | Discovery | Life | 60 | 01/03/2016 |
| 8 | L3 | Discovery | Life | 20 | 01/03/2016 |
| 9 | L4 | Disney | Mickey Mouse | 45 | 01/03/2016 |
| 10 | L1 | CNN | Wolf | 45 | 01/04/2016 |
| 11 | L2 | Discovery | Life | 50 | 01/04/2016 |
| 12 | L3 | Discovery | Life | 50 | 01/04/2016 |
| 13 | L1 | Discovery | Life | 60 | 01/04/2016 |
| 14 | L2 | CNN | Early Start | 20 | 01/04/2016 |
| 15 | L5 | Discovery | Life | 30 | 01/05/2016 |
| 16 | L4 | Disney | Mickey Mouse | 45 | 01/05/2016 |
| 17 | L3 | Discovery | Life | 45 | 01/05/2016 |
| 18 | L2 | CNN | Wolf | 60 | 01/05/2016 |
| 19 | L1 | CNN | Early Start | 60 | 01/06/2016 |
| 20 | L1 | CNN | Wolf | 20 | 01/06/2016 |
| 21 | L2 | ABC | Twisted | 30 | 01/06/2016 |
| 22 | L3 | ABC | Twisted | 30 | 01/06/2016 |
| 23 | L4 | CNN | Wolf | 45 | 01/06/2016 |
| 24 | L5 | CNN | Wolf | 45 | 01/06/2016 |
| 25 | L5 | ABC | Twisted | 30 | 01/06/2016 |
| 26 | L4 | Disney | Mickey Mouse | 20 | 01/06/2016 |

FIG. 3

| LUID | Consumer View 102 | TV Viewership 202 |
|---|---|---|
| L1 | 1,2 | 1,6,10,13,19,20 |
| L2 | 3,4 | 2,7,11,14,18,21 |
| L3 | 5,6 | 3,8,12,17,22 |
| L4 | 7 | 4,9,16,23,26 |
| L5 | 8,9,10 | 5,15,24,25 |

FIG. 4

| # | Gender=F | Gender=M | AGE=70 | AGE=50 | AGE=35 | AGE=6 |
|---|---|---|---|---|---|---|
| 1 | 1 | 0 | 0 | 1 | 0 | 0 |
| 2 | 1 | 0 | 0 | 0 | 1 | 0 |
| 3 | 0 | 1 | 1 | 0 | 0 | 0 |
| 4 | 1 | 0 | 1 | 0 | 0 | 0 |
| 5 | 1 | 0 | 0 | 1 | 0 | 0 |
| 6 | 0 | 1 | 0 | 0 | 1 | 0 |
| 7 | 1 | 0 | 0 | 1 | 0 | 0 |
| 8 | 0 | 1 | 0 | 0 | 1 | 0 |
| 9 | 1 | 0 | 0 | 0 | 1 | 0 |
| 10 | 0 | 1 | 0 | 0 | 0 | 1 |

FIG. 5

| # | NW=ABC | NW=CNN | NW=DISCOVERY | NW=DISNEY | SER=LIFE |
|---|---|---|---|---|---|
| 1 | 0 | 0 | 1 | 0 | 1 |
| 2 | 1 | 0 | 0 | 0 | 0 |
| 3 | 0 | 1 | 0 | 0 | 0 |
| 4 | 0 | 0 | 1 | 0 | 1 |
| 5 | 0 | 0 | 0 | 1 | 0 |
| 6 | 1 | 0 | 0 | 0 | 0 |
| 7 | 0 | 0 | 1 | 0 | 1 |
| 8 | 0 | 0 | 1 | 0 | 1 |
| 9 | 0 | 0 | 0 | 1 | 0 |
| 10 | 0 | 1 | 0 | 0 | 0 |
| 11 | 0 | 0 | 1 | 0 | 1 |
| 12 | 0 | 0 | 1 | 0 | 1 |
| 13 | 0 | 0 | 1 | 0 | 1 |
| 14 | 0 | 1 | 0 | 0 | 0 |
| 15 | 0 | 0 | 1 | 0 | 1 |
| 16 | 0 | 0 | 0 | 1 | 0 |
| 17 | 0 | 0 | 1 | 0 | 1 |
| 18 | 0 | 1 | 0 | 0 | 0 |
| 19 | 0 | 1 | 0 | 0 | 0 |
| 20 | 0 | 1 | 0 | 0 | 0 |
| 21 | 1 | 0 | 0 | 0 | 0 |
| 22 | 1 | 0 | 0 | 0 | 0 |
| 23 | 0 | 1 | 0 | 0 | 0 |
| 24 | 0 | 1 | 0 | 0 | 0 |
| 25 | 1 | 0 | 0 | 0 | 0 |
| 26 | 0 | 0 | 0 | 1 | 0 |

FIG. 9

| Network+Series | Consumer View Position | TV Viewership Position |
|---|---|---|
| Discovery-Life | 1 | 1 |
| | 1 | 13 |
| | 2 | 1 |
| | 2 | 13 |
| | 3 | 7 |
| | 3 | 11 |
| | 4 | 7 |
| | 4 | 11 |
| | 5 | 8 |
| | 5 | 12 |
| | 5 | 17 |
| | 6 | 8 |
| | 6 | 12 |
| | 6 | 17 |
| | 7 | 4 |
| | 8 | 15 |
| | 9 | 15 |
| | 10 | 15 |
| ABC-Twisted | 1 | 6 |
| | 2 | 6 |
| | 3 | 2 |
| | * | * |

| Join Key | Consumer View Join Key Positions | TV Viewership Join Key Positions 1102 | TV Viewership GroupBy Positions 1104 1106 |
|---|---|---|---|
| L1 | 1,2 | 1,6,10,13,19,20 | 1,13 |
| L2 | 3,4 | 2,7,11,14,18,21 | 7,11 |
| L3 | 5,6 | 3,8,12,17,22 | 8,12,17 |
| L4 | 7 | 4,9,16,23,26 | 4 |
| L5 | 8,9,10 | 5,15,24,25 | 15 |

| Join Key | Consumer View Join Key Positions | TV Viewership Join Key Positions | TV Viewership GroupBy Positions |
|---|---|---|---|
| L1 | 1,2 | 1,6,10,13,19,20 | 6 — 1202 |
| L2 | 3,4 | 2,7,11,14,18,21 | 2,21 — 1204 |
| L3 | 5,6 | 3,8,12,17,22 | 22 |
| L4 | 7 | 4,9,16,23,26 | |
| L5 | 8,9,10 | 5,15,24,25 | 25 |

1200

| Network+Series | Consumer View Position | TV Viewership Position |
|---|---|---|
| Discovery-Life | 1 | 1 |
| | 1 | 13 |
| | 2 | 1 |
| | 2 | 13 |
| | 4 | 7 |
| | 4 | 11 |
| | 5 | 8 |
| | 5 | 12 |
| | 5 | 17 |
| | 7 | 4 |
| | 9 | 15 |

FIG. 15

| Network+Series | Consumer View Position | TV Viewership Position |
|---|---|---|
| Discovery-Life | 1 | 1 |
| | 1 | 13 |
| | 2 | 1 |
| | 2 | 13 |
| | 4 | 7 |
| | 4 | 11 |
| | 5 | 12 |
| | 5 | 17 |
| | 7 | 4 |

US 10,657,126 B2

META-JOIN AND META-GROUP-BY INDEXES FOR BIG DATA

CROSS-REFERENCE TO RELATED APPLICATIONS

This is a nonprovisional application of the provisional application Ser. No. 62/438,997, filed on Dec. 23, 2016. The entire disclosure of the above-reference provisional application is incorporated by reference herein.

BACKGROUND

In the age of data overflow and data overload, users of raw data generated, received, processed, etc., from devices constantly use computing devices to analyze these data to find meanings therein or identify meanings that may have overlooked before. With the tremendous growth of cloud storage and computing, data processing or hosting providers continue to increase data storage capacities for the users. At the same, with the increased processing power of processors or microprocessors, as well as internet access speed, the gap between a client-based data processing and cloud-based data processing has decreased dramatically.

The focus on constant increase in data storage and computing power appears, among other things, to address an issue that have negatively affected the table-record data organization structure scheme and data structure software programming. That issue relates to the amount of time, as a function of data organization and/or structure, it takes to obtain the desired data result from queries of datasets. The increase in computing power and data storage technology (e.g., from hard drive disks (HDD) to solid state drives (SSD)) attempts to lessen or alleviate the impact of searching, accessing, and processing of data. However, the time factor is more pronounced especially when the datasets needed for processing includes a very large set, such as a dataset with millions or billions of records.

SUMMARY

Embodiments of the invention improve over conventional or routine technologies by generating a separate data structure or organization, other than those temporary search files that are typically used, that facilitates the processing of the datasets. In one embodiment, instead of using sorted temp files or running sorting algorithms, a meta-join and/or meta-group-by indexes may be generated or created that provide a quick access to the records in the datasets. Moreover, embodiments of the invention eliminate the need to sort or pre-sort datasets before or during a query is conducted on the dataset. Aspects of the invention use, for example, the meta-join and/or meta-group-by indexes to pre-organize the data such that, when executing a query against the dataset, the query is executed against the meta-join and/or meta-group-by indexes.

BRIEF DESCRIPTION OF DRAWINGS

The invention may be better understood by references to the detailed description when considered in connection with the accompanying drawings. The components in the figures may not necessarily be to scale, emphasis instead being placed upon illustrating the principles of the invention. In the figures, like reference numerals designate corresponding parts throughout the different views.

FIG. 1 illustrates an exemplary table showing a sample dataset relating to consumer view of television programming according to one embodiment of the invention.

FIG. 2 illustrates an exemplary table showing a sample dataset relating to television viewership according to one embodiment of the invention.

FIG. 3 illustrates an exemplary table for a Meta-Join Index joined using a locally unique identifier (LUID) key to FIGS. 1 and 2 according to one embodiment of the invention.

FIG. 4 illustrates an exemplary table of a column values bitmap index for the sample dataset in FIG. 1 according to one embodiment of the invention.

FIG. 5 illustrates an exemplary table of column values bitmap index for the sample dataset in FIG. 2 according to one embodiment of the invention.

FIG. 9 illustrates an exemplary table showing a Meta-Group-by Index for a sample query on the sample datasets of FIGS. 1 and 2 grouped by Network & Series and joined using the LUID key according to one embodiment of the invention.

FIG. 11 illustrates an exemplary table showing bitmap positions for all records with values Discovery-Life (1, 4, 7, 8, 11, 12, 13, 15, 17) and intersect that with TV Viewership Join key position for each join key according to one embodiment of the invention.

FIG. 12 illustrates an exemplary table showing bitmap positions for all records with values ABC-Twisted (2, 6, 21, 22, 25) and intersect that with TV Viewership Join key position for each join key according to one embodiment of the invention.

FIG. 15 illustrates an exemplary table showing a filtered records list based on FIG. 14 according to one embodiment of the invention.

Figure 6:
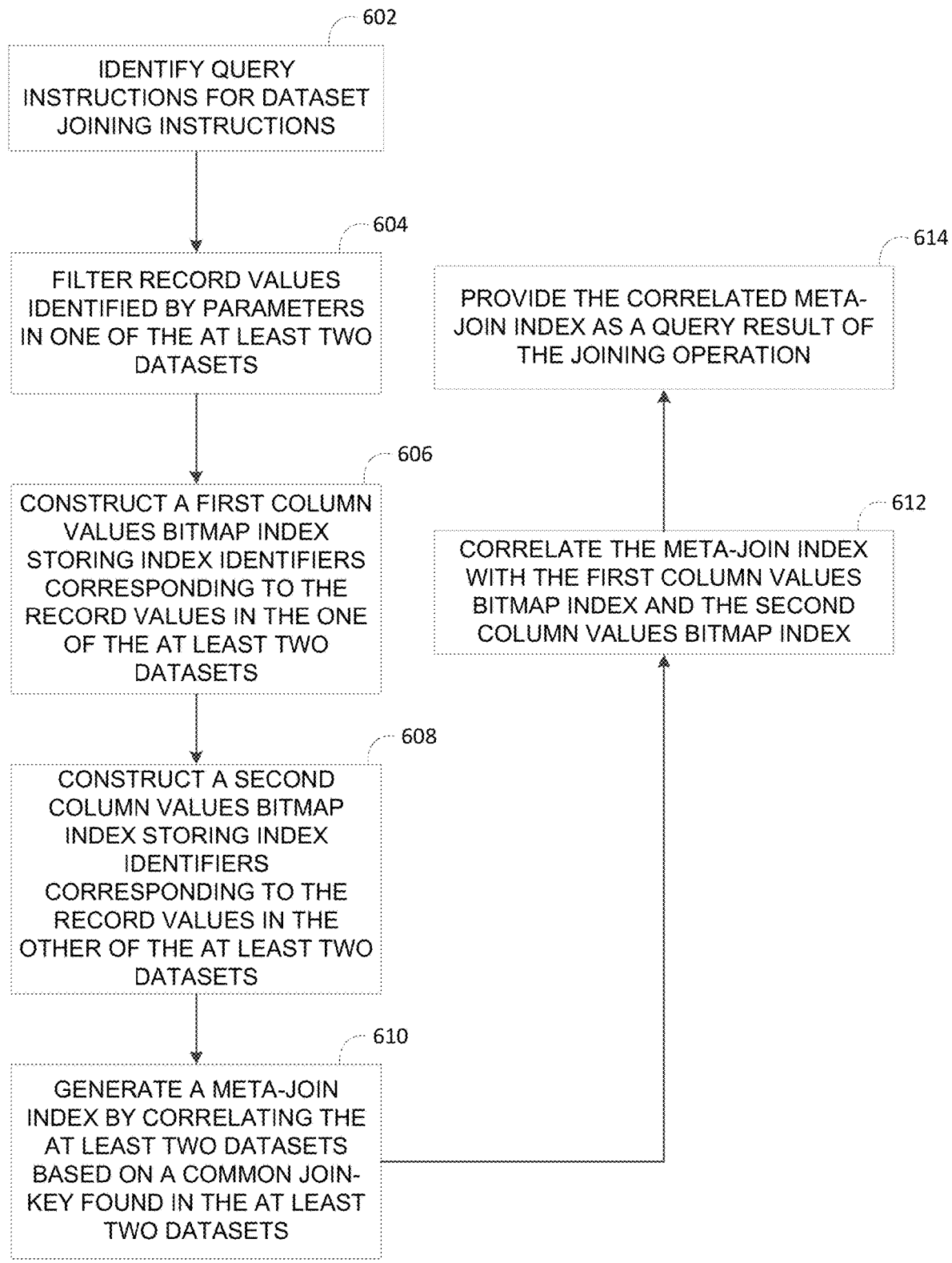
FIG. 6 illustrates a flowchart showing a method for generating a meta-join index according to one embodiment of the invention.

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment may often not be depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein may be defined with respect to their corresponding respective areas of inquiry and study except where specific meanings have otherwise been set forth herein.

DETAILED DESCRIPTION

The present invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

It is to be understood that analysts of all disciplines, either in a scientific field, social science studies, manufacturing, etc., constantly face with plethora of data to identify and process. Part of these analyses is to generate insights out of different datasets. There are many approaches, but one of the approach is to identifying correlations between datasets. In such an attempt, one may perform a join operation of two or more datasets stored in database storage or structures. The "join" operation may be part of database programming and such operation typically includes a syntax and a set of required parameters for a database oriented computer, such as a database server, to execute and generate results. When the datasets are small, the joining operation does not take very long, and the results are typically provided or generated instantaneously. However, as the size of the datasets starts growing exponentially, the join performance suffers significantly. This is because the join operation requires sorting and searching of the relevant data fields in the targeted datasets before producing an output dataset with the joined results.

As an illustration and not as a limitation, consider an example shown in FIG. 1, a table illustrating a sample of dataset relating to consumer views of TV programs and a table of a sample dataset of TV viewership of particular TV programming in FIG. 2. It is to be understood that other types of data may be used without departing from the scope and spirit of embodiments of the invention.

To generate some insights from the datasets, for example, consider the following query instructions:
SELECT PID, AGE, INCOME, NETWORK, SERIES
FROM EXPERIAN, TV
WHERE EXPERIAN.LUID=RV.LUID
AND GENDER='F'
AND SHOWDATE BETWEEN Jan. 4, 2016 AND Jan. 6, 2016
AND (NETWORK LIKE 'D*' OR SERIES LIKE 'L*')
AND VIEWEDFOR>40

As a further assumption, assume the number of records in consumer view dataset is 200 million records and the number of records in TV viewership dataset is 2 billion records.

The above query would be solved by most of the current database solution using one of the following approaches as an example:
Nested Loop Join
Hash Join
Sort-Merge Join The challenge with any traditional join approach that causes performance problem is:
Record Seek Time (from hard drive disk or SSD).
Temp Table Generation (for Sorting)

One may suppose that the dataset may be stored in the "cloud", but it is to be understood that the cloud-based solution for such large dataset may actually be worse than assumed above. Cloud-based solution requires physical storage of data, and cloud-based solution actually has data transmission time and cost to the record seek time and temp table generation as the user is seeking dataset that may be physically stored or housed in different locations.

As a further illustration, the following example demonstrates the overhead of file seeks in HDDs, especially when multiple seeks need to be done when joining two or more tables:

Assuming there are 100K records per file block, 10 Seeks may be required per million records, 10000 seeks per billion records=100,000×2 milliseconds=200 seconds. If SSDs were used, the seek time would be reduced, but it still would take an estimate of about 50 seconds or so just to do file seeks for billion records.

The time estimates above, e.g., around 50 to 200 seconds, are merely for the seek operation to seek the data without even performing any kind of join operation across the datasets yet.

At the same time, existing practices by the construct of database management and memory management inevitably would create temp tables for joins involving large number of records, due to the need for sorting records for calculating aggregate functions. The creation of temp tables, seeking memory storage for the temp tables, writing and reading the temp tables, etc., further add to the overall query processing time and further reducing the query performance substantially.

According to one embodiment of the invention, a "Meta-Join Index" structure may be created or generated to remove the need for having to do join at runtime. This approach is especially useful for query executions. In another embodiment, the meta-join index may provide index identifier, such as a pointer to a record of another dataset.

Referring now to FIG. 3, an exemplary table shows a Meta-Join Index using a locally unique identifier (LUID) key to join sample datasets shown in FIGS. 1 and 2 according to one embodiment of the invention. In one embodiment, the meta-join index may be presented in a table format. It is to be understood that other format or table dimensions may be used without departing from the scope or spirit of the aspects of the invention.

In the example illustrated in FIG. 3, a table 300 shows a result of joining two tables, table 100 in FIG. 1 and table 200 in FIG. 2. For example, in the table 100 in FIG. 1, fields 102 may identify #1 and #2 that are associated with locally unique identifier (LUID) "L1". In table 200, fields 202 may identify #1, #6, #10, #13, #19, and #20 that are associated with the same common join key, LUID L1. Upon joining the two tables, the meta-join index table 300 in FIG. 3, organized by LUID in column 302, may provide an index to the respective tables. For example, in column 304, the table 300 provides index references to #1 and #2, by the reference number 102, of the table 100 (as identified by label "Consumer View"). Similarly, in column 306, the table 300 provides index references to #1, #6, #10, #13, #19 and #20, by the reference number 202, of the table 200 (as identified by the label "TV Viewership").

In one embodiment, the Meta-Join Index may store a key-value pair of record positions of each dataset records that have valid join condition match. In another embodiment, the Meta-Join index may be segmented per partition and the partition key is configurable.

In this embodiment shown in FIG. 3, the table 300 is used for simplification purposes and not as a limitation. In this example, the table 300 is not divided by partition. However, in other examples, the table 300 or a meta-join index may be partitioned, such as partitioned one or more times by date (range). For example, a Meta-join index may be created for all dataset, for each date, per month, per quarter, etc. based on the data partitioning needs.

In a further embodiment and to facilitate the faster way to obtain the query results, a column values bitmap index may be used. In one example, the column values bitmap index may be used to be able to compact the dimension values to a very small footprint with respect to data memory or storage. This advantage may enable easy load in memory. Moreover, this compacted dimension may be used for filtering out any records based on the WHERE conditions specified in the execution query for each dataset. In one example, one may reduce the storage space requirement for the bitmap index by using the natural positioning of the bit to match with the record position for that column value and remove the need to store the actual position value for each bit in memory. In one example, FIG. 4 illustrates an exemplary table showing a column values bitmap index for a sample of the consumer view dataset, as seen in FIG. 1. It is to be understood that not all dimensions and its column value bitmap are shown above of the entire consumer view dataset. For illustration purpose only and not as a limitation, only the ones that are needed for the execution of the above query example are shown here. For example, as shown in FIG. 1, the table 100 indicates that field 104 specifies the user identified in #1 is a female and field 106 indicates that user is 50 years old. In the column values bitmap index, the same information for the same user in 104 and 106 are reflected in 402 and 404 in table 400, respectively.

Similarly, FIG. 5 illustrates an exemplary table of column values bitmap index for the sample dataset in FIG. 2 according to one embodiment of the invention. As an illustration, table 500 represents the same information as represented by 204 and 206 in 502 and 504, respectively. As explained above, the column values bitmap index reduces the memory storage needs for representing the same information and may significantly improve data processing time. It is to be understood that not all dimensions and its column value bitmap are shown above of the entire consumer view dataset. For illustration purpose only and not as a limitation, only the ones that are needed for the execution of the above query example are shown here.

In one embodiment, with the meta-join index and column values bitmap index constructed, one could use the two data structures to execute the query with much better performance and without the need for high hardware cost that incurred using other conventional or routine solutions. In another embodiment, instead of executing the queries against the dataset directly or a copy of the dataset, computing devices may first construct the meta-join index and column values bitmap index from the datasets before the complete query is executed against the datasets. In a further embodiment, the meta-join index and column values bitmap index for any given dataset may be constructed pre-computation or pre-runtime automatically. In another embodiment, the meta-join index and column values bitmap index for any given dataset may be constructed upon user instructions or requests before a query or a join operation is received or executed.

Referring to FIG. 6, a flowchart shows a method for generating a meta-join index according to one embodiment of the invention. In one embodiment, the meta-join index may be used to execute the sample query below. In this example, a column values bitmap index may be used.

SELECT PID, AGE, INCOME, NETWORK, SERIES
FROM EXPERIAN, TV
WHERE EXPERIAN.LUID=RV.LUID
AND GENDER='F'
AND SHOWDATE BETWEEN Jan. 4, 2016 AND Jan. 6, 2016
AND (NETWORK LIKE 'D*' OR SERIES LIKE 'L*')
AND VIEWEDFOR>40

Using the set of query instructions as an example above, at 602, a joining operation for at least two datasets in query instructions against a plurality of datasets are identified. For example, there may be a set or a plurality of query instructions that a system or a computer receives. For example, the instructions may be received directly from a user or may be received from an automated or scheduled channel. For example, instructions may be received in a batch file. Among the received instructions, for example, the joining operation instruction may be one of them and embodiments of the invention identify the joining operation instructions from the plurality of instructions. Also, as illustrated above, the joining operation instructions include parameters, syntax rules, etc. For example, the joining operation instruction may include parameters or conditions such as "WHERE" as a part of the joining operation. At 604, parameters in the joining operation identifying record values in one of the at least two datasets are filtered. For example, in the "WHERE" instruction, the parameter such as "GENDER=F" identifies record values in the table 100 in FIG. 1. On the other hand, in this example, the "WHERE" instruction fails to include a parameter "GENDER=M". As such, any record values not associated with the parameter "GENDER=F" may be filtered out. At 606, a first column values bitmap index may be constructed storing index identifiers corresponding to the record values in the one of the at least two datasets identified by the filtered parameters. Using table 1 as an example, since the "WHERE instruction requires the parameter be "Gender=F", the record values associated with table 1 satisfying such criteria would be records for: 1, 2, 4, 5, 7, 9.

At 608, the same approach in 606 is applied to the other dataset. For example, in the WHERE instructions, there are additional parameters: (NETWORK LIKE 'D*' OR SERIES LIKE 'L*') AND VIEWEDFOR>40, and each of which identifies corresponding data values identified by the parameters. As such, a second column values bitmap index may be constructed storing index identifiers corresponding to the record values in the other of the at least two datasets identified by the filtered parameters. It is of course to be understood that the filtering process will include first identifying the parameters, and then data values in the dataset that are identified by the parameters before the filtering process may begin. Also, for simplicity purposes only and not as a limitation, the above example is not partitioned by date. If it was, the steps 602 through 608 may be applied per partition that fits the WHERE condition.

In one example, by using the bitmap indexes for 3 columns—Network, Series & VIEWEDFOR, one would obtain the following record positions: 1, 4, 7, 9, 11, 12, 13, 17.

At 610, a meta-join index is constructed or generated by correlating the at least two datasets based on a common join-key found in the at least two datasets. For example, as previously described in FIGS. 1 through 3, a meta-join index may be constructed by identifying each common join-key in table 100 and table 200. After the construction, at 612, the meta-join index is further correlated or intersected with the first column values bitmap index from 606 and the second column values bitmap index from 608.

Example, for LUID L1, the table 300 intersects column 304 (from 102) with 1, 2, 4, 5, 7, 9, from the first column values bitmap index gets 1, 2 after the intersection. Similarly, for the common join-key L1, the table 300 intersects column 306 (from 202) with 1, 4, 7, 9, 11, 12, 13, 17 from the second column values bitmap index to get 1, 13.

Figure 7:
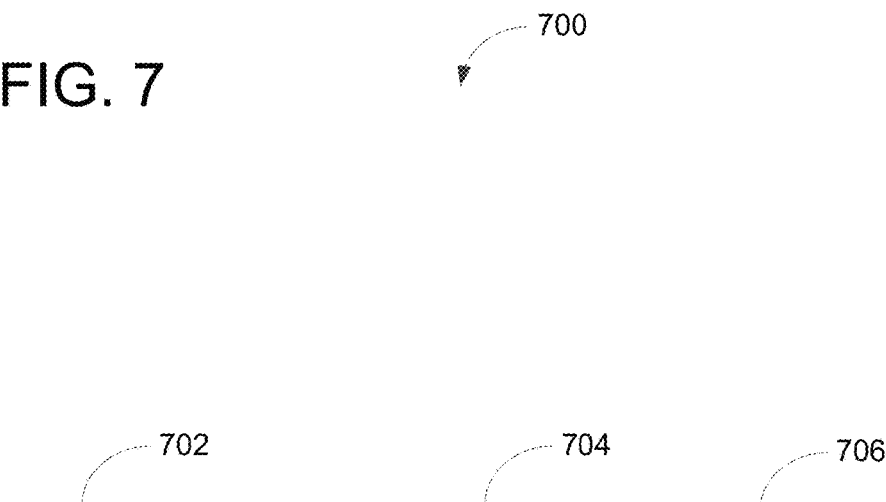
FIG. 7 illustrates an exemplary table showing a updated meta-join index according to one embodiment of the invention.

At 614, the correlated meta-join index is provided as a result in advance of completing the joining operation instruction. For example, in one embodiment, FIG. 7 illustrated a table 700 for an updated or a correlated meta-join index according to the steps illustrated above. In this example, all records that need to be included in the result for L1 are expanded. In other words, the permutations of values may be created by reviewing both datasets:

1—1
1—13
2—1
2—13

It is to be understood the same process or steps may be performed for all the Join keys and return the final result set based on the meta-join index to user.

As one would readily identify in the above examples, embodiments of the invention, with the use of the meta-join index, eliminate or avoid the need for any sorting, temp table creation or doing file seeks 100K times for the joining operation. Instead of executing the joining operation instruction on the datasets directly—hence the need for sorting, temp table creation or doing file seeks—aspects of the invention execute on the meta-join index. By eliminating or without the sorting of large portion of dataset and large number of file seeks, aspects of the invention gain substantial improvement in the overall query performance using a very economical hardware, just by utilizing Meta-Join Index along with bitmap indexes. Embodiments of the invention overcome the conventional and routine approach of processing joining operation instructions.

In a further embodiment, a meta-group-by index may be constructed to further facilitate operations performed on datasets. Using an exemplary set of database query instructions below as an example:

SELECT NETWORK, SERIES, COUNT(PID)
FROM EXPERIAN, TV
WHERE EXPERIAN.LUID=RV.LUID
AND GENDER='F'
AND VIEWEDFOR>40
GROUP BY NETWORK, SERIES

Currently available computer software products require doing the sorting or shuffling of data that requires "group-by" or "group by" clause. This requirement is a significantly costly operation to perform and causes significant performance impact in query executions with "group-by" clause. Since the dataset size is large (e.g., million or billion data values), the sorting process involves again creating temp files and performing aggregation functions against the temp table dataset, and hence result in slow overall query execution.

In one embodiment, a "Meta-Group-by Index" removes the need for having to do sorting or shuffling at runtime for query executions. For example, the meta-group-by index stores a key-value pair of record positions of each dataset records based on the distinct group by column values. The Meta-Group-by Index may, in one example, be calculated using the pre-created Meta-Join index described above and the column values bitmap index.

FIG. 9 shows a Meta-Group-by Index for the above sample query that has datasets grouped by Network & Series and joined using the LUID key. In order to obtain such meta-group-by index, FIGS. 10-12 and 16 are used to illustrate such embodiments.

In this example, the grouping condition includes GROUP BY NETWORK, SERIES. A such, in FIG. 10, table 1002 illustrates each Network-Series pairs.

Further, FIG. 11 illustrates a table 1100 for finding a matching TV Viewership Group-by positions by doing intersection of the appropriate column value bitmap index with the TV Viewership Join Key positions. For example, for the "Discovery-Life" pair, based on FIG. 2, the records are: [1, 4, 7, 8, 11, 12, 13, 15, 17].

FIG. 11 illustrates positions for all records with values of "Discovery-Life (1, 4, 7, 8, 11, 12, 13, 15, 17) and intersect that with TV Viewership Join key position for L1 in 1102 for each join key.

So for LUID L1, in one embodiment, it would be:

1, 4, 7, 8, 11, 12, 13, 15, 17∩1, 6, 10, 13, 19, 20 yields 1 and 13 as identified in 1104 in FIG. 11.

For LUID L2 intersecting with the same "Discovery-Life" pair, the intersection yields:

1, 4, 7, 8, 11, 12, 13, 15, 17∩2, 7, 11, 14, 18, 21=7 and 11 as identified in 1106 in FIG. 11.

The above intersection is done for each of the join keys between keys in TV Viewership and consumer view of TV Programming. In another embodiment, another intersection may be made for a different NETWORK-SERIES grouping, such as the "ABC-Twisted" (i.e., "ABC" is the NETWORK and "Twisted" is the SERIES) grouping and the positions are [2, 6, 21, 22, 25] (according to FIG. 2) as shown in FIG. 12.

For example, for LUID L1 intersecting with the "ABC-Twisted" pair, the intersection yields:

2, 6, 21, 22, 25∩1, 6, 10, 13, 19, 20 yields 6 as identified in 1202 in table 1200 in FIG. 12.

In another example, for LUID L2 intersecting with the "ABC-Twisted" pair, the intersection yields:

2, 6, 21, 22, 25∩2, 7, 11, 14, 18, 21 yields 2 and 21 as identified in 1204 in table 1200 in FIG. 12.

Figure 13:
FIG. 13 illustrates an exemplary table showing a meta-group-by index with two grouped dataset values according to one embodiment of the invention.

Once a table with each join keys is obtained, one may compute a Meta-Group-by Index by doing the permutation of the Consumer View Join Key Positions with the TV Viewership Group-by Positions for each unique Network-Series Value. This may result in the table shown by the Meta-Group-by Index in earlier section in FIG. 13 in table 1300 for just two Network-Series values for a grouping of "Discovery"—"Life" and "ABC"—"Twisted".

The following is a further example of a sample query instruction shown above and the sequences of step for executing that query using a meta-group-by index:

SELECT NETWORK, SERIES, COUNT(PID)
FROM EXPERIAN, TV
WHERE EXPERIAN.LUID=RV.LUID
AND GENDER='F'
AND VIEWEDFOR>40
GROUP BY NETWORK, SERIES

Figure 16:
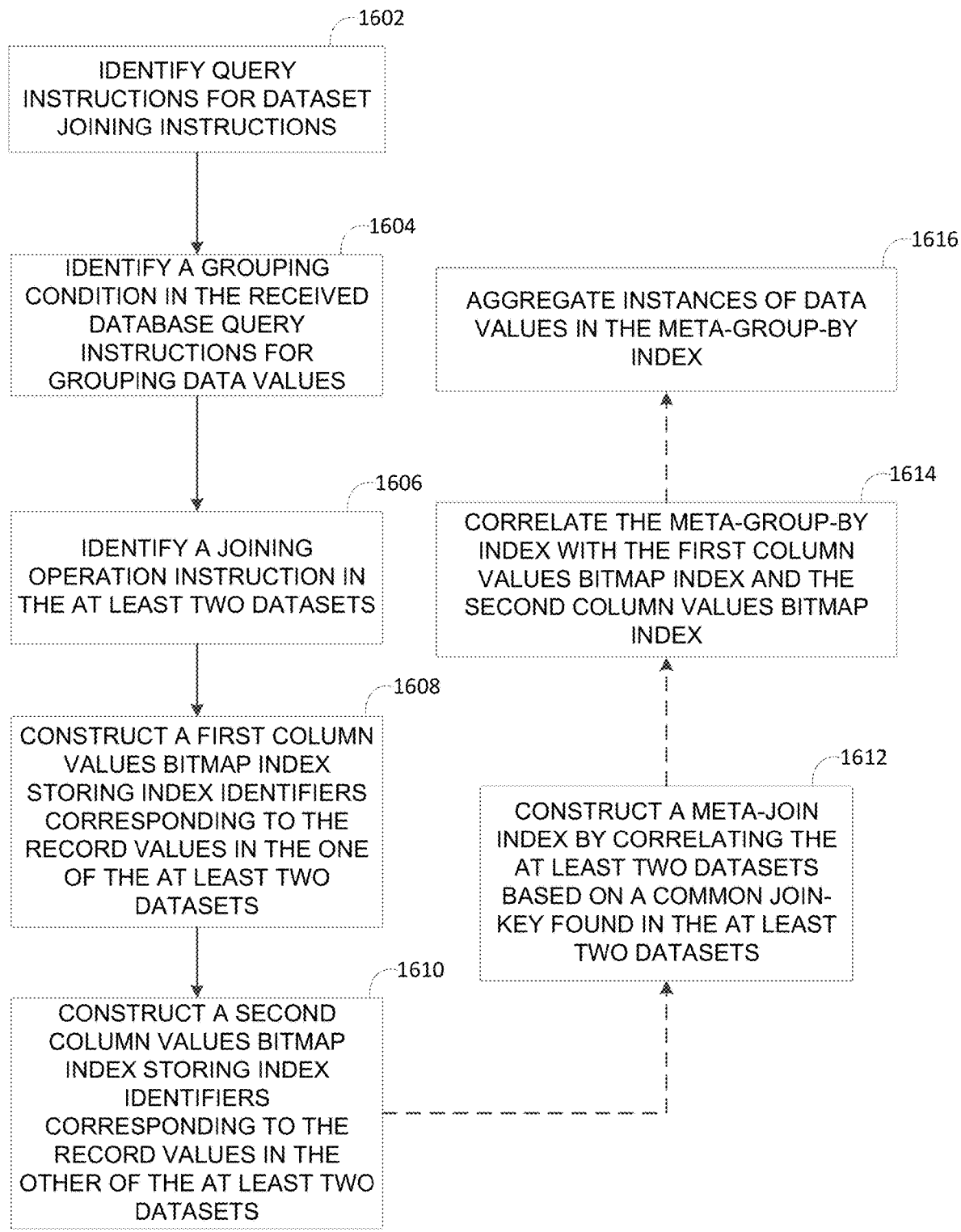
FIG. 16 illustrates a flowchart showing a method for generating a meta-group-by index according to one embodiment of the invention.

Using FIG. 16 as an example to illustrate the exemplary methods, at 1602, database query instructions for grouping data in at least two datasets are received. For example, there may be a set or a plurality of query instructions that a system or a computer receives. For example, the instructions may be received directly from a user or may be received from an automated or scheduled channel. For example, instructions may be received in a batch file. Among the received instructions, for example, the joining operation instruction may be one of them and embodiments of the invention identify the joining operation instructions from the plurality of instructions. Also, as illustrated above, the joining operation instructions include parameters, syntax rules, etc.

At 1604, a grouping condition in the received database query instructions for grouping data values in the at least two datasets is identified. In addition, joining operation instruction is identified at 1606. In one example, a "WHERE" statement or condition may be an example of a joining operation instruction. As such, at 1608, a first column values bitmap index storing index identifiers corresponding to the record values in the one of the at least two datasets is constructed. For example, the joining operation instruction may include parameters or conditions such as "WHERE" which indicates "Gender=F" as one of the criteria, so we will need records with following positions in consumer view dataset according to table 100 in FIG. 1. For example, using table 100 in FIG. 1, positions that may be filtered may be: #1, #2, #4, #5, #7, and #9.

Similarly, in response to filter all the record positions for TV Viewership dataset and only keep the ones needed using the column value bitmap indices, a first column values bitmap index storing index identifiers corresponding to the record values in the one of the at least two datasets is constructed at 1610. In the example above, using the NETWORK-SERIES example of "Discovery-Life" as an example, the positions are: #1, #2, #4, #6, #7, #9, #10, #11, #12, #13, #16, #17, #18, #19, #23, and #24 (based on data values in table 200 in FIG. 2).

In one embodiment, for each of the Network-Series value in the Meta-Group-by-Index apply filter to only include the records with above positions.

Figure 14:
FIG. 14 illustrates an exemplary table showing a filtered records list according to one embodiment of the invention.

Moreover, once applying the "VIEWEDFOR>40" condition in the "WHERE" part of the joining operation instruction and satisfying the "GROUP-BY" condition, a meta-group-by index table 1500 in FIG. 15 may constructed at 1614 showing the grouped result. In one embodiment, a meta-join index may be constructed in the interim, using the illustration in FIGS. 6 and 7. For example, using the table 1400 in FIG. 14 as an example, the meta-join index is constructed at 1612 showing the exemplary positions above with respect to the consumer view dataset and the Network-Series pair of "Discover-Life".

In a further embodiment, at 1616, an aggregate function may be executed for each of the filtered records list per Network-Series value. In example illustrated in FIG. 15, the aggregated function may show a result for the "Discover-Life" pair of "9".

As one would appreciate from 1602 through 1616, there is no need to do any sorting, temp table creation or doing file seeks 100K times based on embodiments of the invention. By eliminating the problems of sorting of large portion of dataset and large number of file seeks, embodiments of the invention gain substantial improvement in the overall query performance using a very economical hardware, just by utilizing Meta-Group-by Index along with Meta-Join Index and the bitmap indexes that was pre-computed for the datasets as shown above.

As with the other examples provided in this disclosure, examples are done for simplicity and not as a limitation, only two columns are used for the group-by, the above logic applies to any number of columns that can be included in the group by.

Figure 17:
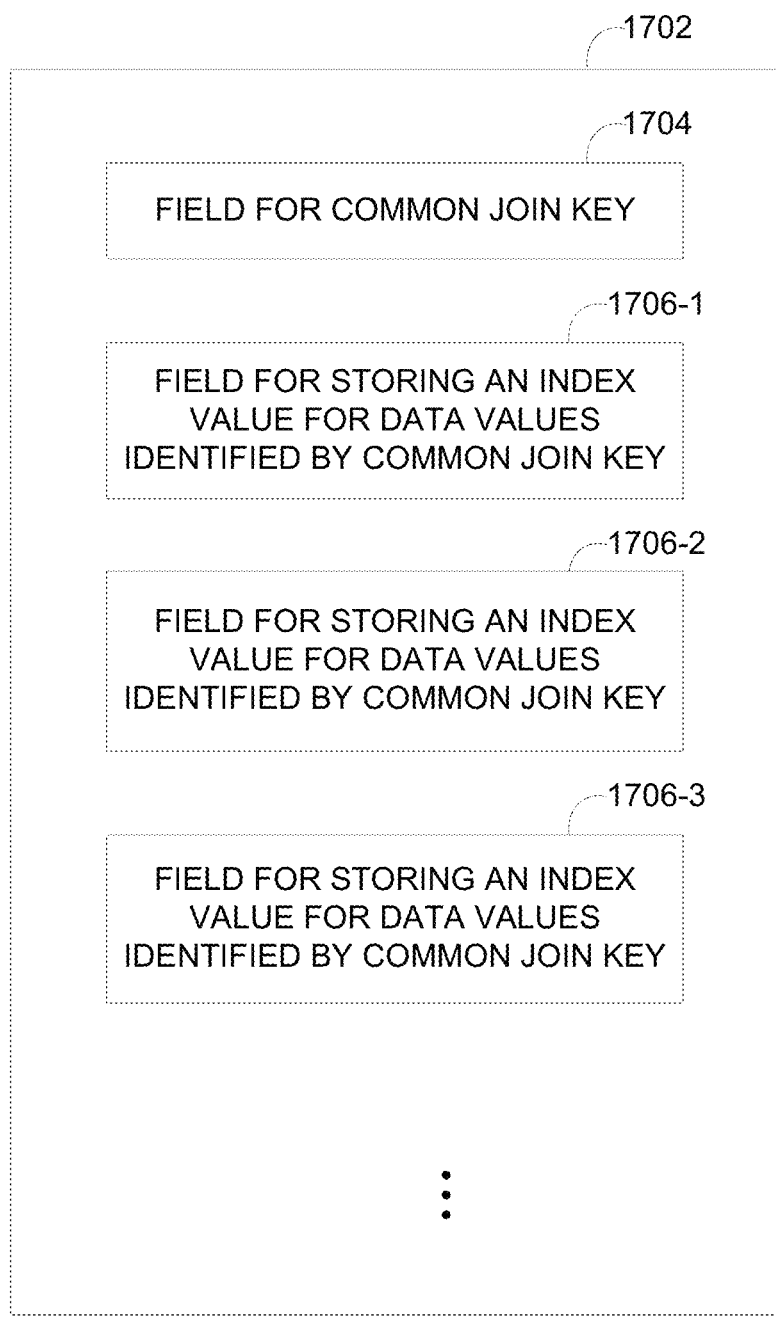
FIG. 17 illustrates an exemplary data structure for a meta-join index according to one embodiment of the invention.

FIG. 17 illustrates a data structure 1702 having data fields for storing a meta-join index according to one embodiment of the invention. For example, as described relating to FIGS. 3 and 7 above, the data structure 1702 may include a field 1704 for a common join-key. For example, using FIG. 7 as an example, the common join-key is the LUID column 702. As such, the fields in the first column stores the LUID values. Moreover, the data structure 1702 includes one or more fields 1706-1 through 1706-n (where n>0) each storing an index value for data values identified by the common join-key. Again, using FIG. 7 as an example, the two columns 704 and 706 store index values identified in the two joined datasets: Consumer View and TV Viewership. It is to be understood that other number of datasets may be represented by the data structure 1702 without departing from the scope or spirit of the invention.

Figure 18:
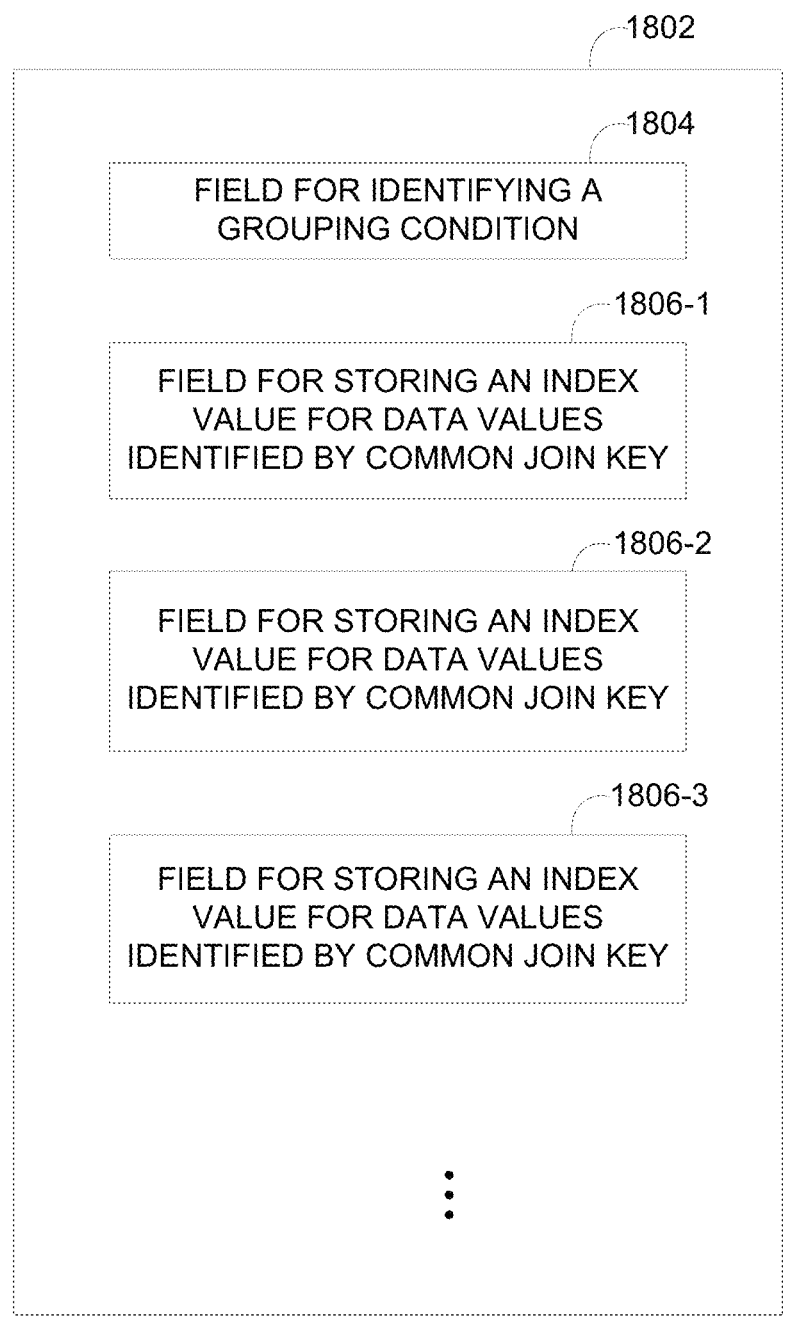
FIG. 18 illustrates an exemplary data structure for a meta-group-by index according to one embodiment of the invention.

As another illustration, FIG. 18 provides a diagram showing a data structure 1802 having data fields for storing a meta-group-by index according to one embodiment of the invention. Using FIG. 15 as an example, the data structure 1802 includes a field 1804 for identifying a grouping condition. For example, column 1502 includes a field for identifying the particular grouping condition, such as a "Network-Series" pair of "Discovery-Life." It is to be understood that other grouping conditions may be used without departing from the scope or spirit of embodiments of the invention.

Moreover, the data structure 1802 includes additional data fields for 1806-1 through 1806-n (where n>0) each storing an index value for data values identified as a result of the join and grouping conditions. Again, using FIG. 15 as an example, the two columns 1504 and 1506 store index values identified in the two joined datasets. It is to be understood that the data fields 1806 and 1706 do not store the actual data values; they store index value identifying the relevant data values in the datasets. As explained, this is beneficial and economical for executing joining or grouping operations, especially in large datasets.

Figure 8:
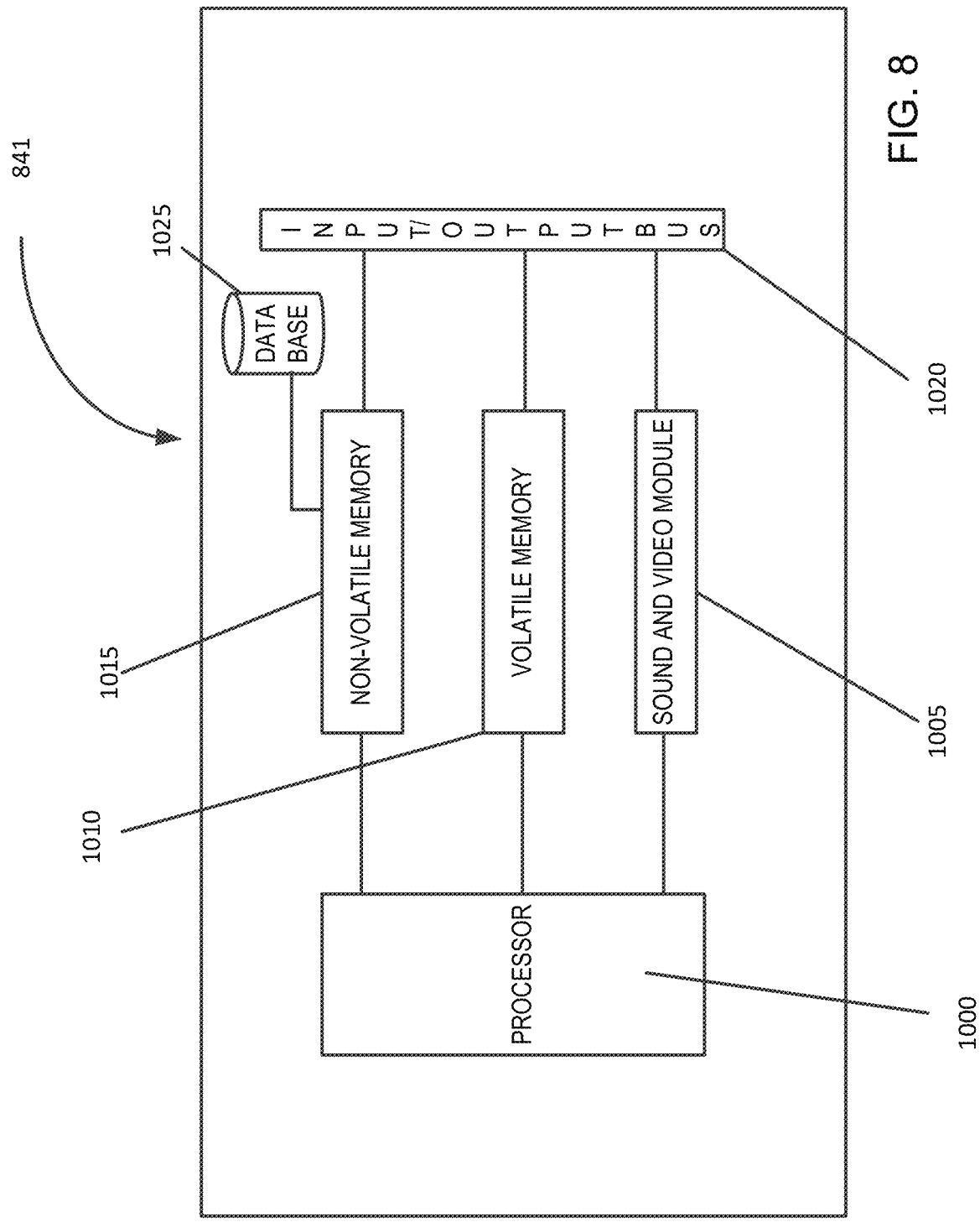
FIG. 8 illustrates a diagram showing an exemplary computing device according to one embodiment of the invention.
Figure 10:
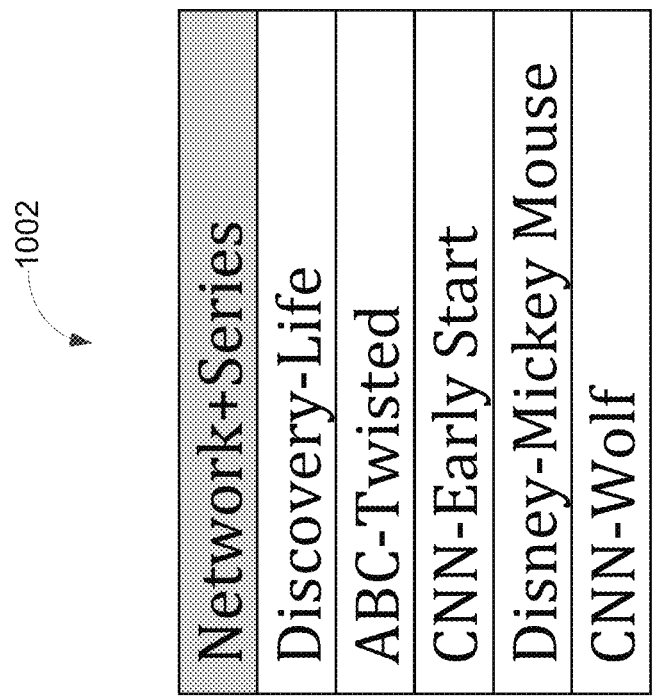
FIG. 10 illustrates an exemplary table showing distinct paired dataset according to one embodiment of the invention.

It is further to be understood that a computer system in a form of a computing device or a computer may be used to execute computer-executable instructions illustrated above. Such a computer system may be illustrated in FIG. 8 as a computing device 841. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The claimed system and method may address several technical problems and challenges, some of which are described. Currently, entering potential sensitive data across networks makes users nervous to the point that a sale may be lost or money or time saving tips or coupons may not be received. By using a proprietary network such as a payment network, to transfer potentially sensitive data, security may be higher and users may be more open to joining additional beneficial programs. Similarly, moving data from one payment system to another loyalty system has felt risky to some users, but by using a proprietary, trusted network, the data may be communicated in a more trustworthy fashion. In addition, formatting data and communicating data in a manner which may be understood by a variety of additional programs is a technical challenge or problem which the system and method has addressed.

The user devices, computers and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving data payload execution systems. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed is:

1. A computerized system configured for generating a plurality of data fields representing a meta-group-by index for storage on a non-transitory computer-readable medium comprising:
    a memory for storing datasets;
    a computer-executable processor, accessible to the memory, configured for executing computer-executable instructions for:
    receiving database query instructions based on a group-by operation for grouping data in at least two datasets;
    identifying a grouping condition in the group-by operation in the received database query instructions for grouping data values in the at least two datasets;
    instead of executing the grouping condition on the at least two datasets in the memory, creating a meta-group-by index in response to the identified grouping condition, said creating the meta-group-by index comprising:
        identifying a joining operation instruction for the at least two datasets;
        filtering record values in a first dataset of the at least two datasets identified by parameters in the joining operation instruction;
        constructing a first column values bitmap index storing index identifiers corresponding to the filtered record values in the first dataset of the at least two datasets identified by the identified parameters;
        constructing a second column values bitmap index storing index identifiers corresponding to the filtered record values in a second dataset of the at least two datasets identified by the identified parameters;
        storing a key-value pair of record positions of each of the record values in the first dataset and the second dataset that have a valid join condition match,
    wherein the meta-group-by index is configured to be segmented by a partition key,
    wherein the partition key is configurable; and
    executing, by the computer-executable processor, the grouping condition on the created meta-group-by index.

2. The computerized system of claim 1, wherein the processor is further configured to execute the following computer-executable instructions after constructing the second column values bitmap index:
    constructing a meta-join index by correlating the at least two datasets based on a common join-key found in the at least two datasets; and
    correlating the meta-join index with the first column values bitmap index and the second column values bitmap index.

3. The computerized system of claim 2, wherein the common join-key comprises a locally unique identifier (LUID).

4. The computerized system of claim 1, wherein the processor is further configured to aggregate instances of data values in the meta-group-by index.

5. The computerized system of claim 1, wherein the meta-group-by index comprises a table.

6. The computerized system of claim 1, wherein the processor is configured to create the meta-group-by index comprises the processor is configured to create the meta-group-by index without first sorting the at least two datasets.

7. The computerized system of claim 1, wherein the processor is configured to create the meta-group-by index comprises the processor is configured to create the meta-group-by index without creating temporary tables for the at least two datasets.

8. The computerized system of claim 1, wherein the processor is configured to create the meta-group-by index comprises the processor is configured to create the meta-group-by index without executing a file seek operation on the at least two datasets.

9. A computerized method configured for generating a plurality of data fields representing a meta-join index for storage on a non-transitory computer-readable medium comprising:
    identifying, by a computer-executable processor, a joining operation instruction for at least two datasets in a plurality of datasets;
    without executing the joining operation instruction on the at least two datasets, creating, by the computer-executable processor, a meta-join index in response to the identified joining operation instruction, said creating the meta-join index comprising:
        filtering, by the computer-executable processor, record values in a first dataset of the at least two datasets identified by parameters in the joining operation instruction;
        constructing, by the computer-executable processor, a first column values bitmap index storing index identifiers corresponding to the filtered record values in the first dataset of the at least two datasets identified by the parameters;
        constructing, by the computer-executable processor, a second column values bitmap index storing index identifiers corresponding to record values in datasets other than the filtered record values in the first dataset of the at least two datasets identified by the parameters;
        generating, by the computer-executable processor, the meta-join index by correlating the at least two datasets based on a common join-key found in the at least two datasets;
        storing a key-value pair of record positions of each of the record values in the first dataset and the second dataset that have a valid join condition match, wherein the meta-join index is configured to be segmented by a partition key, wherein the partition key is configurable; and executing, by the computer-executable processor, the joining operation instruction on the created meta-join index.

10. The computerized method of claim 9, wherein the common join-key comprises a locally unique identifier (LUID).

11. The computerized method of claim 9, wherein the meta-join index comprises a data structure having a data field for identifying the common join-key and a plurality of data fields each for storing an index value.

12. The computerized method of claim 9, wherein creating the meta-join index comprises creating the meta-join index without sorting the at least two datasets.

13. The computerized method of claim 9, wherein creating the meta-join index comprises creating the meta-join index without creating temporary tables for the at least two datasets.

14. The computerized method of claim 9, wherein creating the meta-join index comprises creating the meta-join index without conducting a file seek operation on the at least two datasets.

15. A computerized system configured for generating a plurality of data fields representing a meta-join index for storage on a non-transitory computer-readable medium comprising:
a memory for storing datasets;
a computer-executable processor, accessible to the memory, configured for executing computer-executable instructions for:
receiving database query instructions from a user for joining data in at least two datasets;
identifying a joining operation instruction for at least two datasets in a plurality of datasets;
instead of executing the joining operation instruction on the at least two datasets in the memory, creating a meta-join index in response to the identified joining operation instruction, said creating the meta-join index comprising:
filtering record values in a first dataset of the at least two datasets identified by parameters in the joining operation instruction;
constructing a first column values bitmap index storing index identifiers corresponding to the filtered record values in the first dataset of the at least two datasets identified by the parameters;
constructing a second column values bitmap index storing index identifiers corresponding to the filtered record values in a second dataset of the at least two datasets identified by the parameters;
generating the meta-join index by correlating the at least two datasets based on a common join-key found in the at least two datasets;
storing a key-value pair of record positions of each of the record values in the first dataset and the second dataset that have a valid join condition match, wherein the meta-join index is configured to be segmented by a partition key, wherein the partition key is configurable; and
executing, by the computer-executable processor, the joining operation instruction on the created meta-join index.

16. The computerized system of claim 15, wherein the common join-key comprises a locally unique identifier (LUID).

17. The computerized system of claim 15, wherein the meta-join index comprises a table.

18. The computerized system of claim 15, wherein the processor is configured to create the meta-join index comprises the processor is configured to create the meta-join index the meta-join index without first sorting the at least two datasets.

19. The computerized system of claim 15, wherein the processor is configured to create the meta-join index comprises the processor is configured to create the meta-join index the meta-join index without creating temporary tables for the at least two datasets.

20. The computerized system of claim 15, wherein the processor is configured to create the meta-join index comprises the processor is configured to create the meta-join index the meta-join index without executing a file seek operation on the at least two datasets.

* * * * *